United States Patent [19]

Stencel

[11] Patent Number: 5,350,264
[45] Date of Patent: Sep. 27, 1994

[54] BLIND FASTENER WITH REINFORCED CONTAINMENT SLEEVE

[75] Inventor: Edgar L. Stencel, Alta Loma, Calif.

[73] Assignee: Monogram Aerospace Fasteners, Inc., Los Angeles, Calif.

[21] Appl. No.: 37,923

[22] Filed: Mar. 26, 1993

[51] Int. Cl.$^5$ ............................................. F16B 13/06
[52] U.S. Cl. ................................... 411/55; 411/38
[58] Field of Search ............... 411/34, 43, 55, 44, 411/54, 38, 70

[56] References Cited

U.S. PATENT DOCUMENTS

| | | | |
|---|---|---|---|
| 2,787,185 | 4/1957 | Rea et al. | 411/55 X |
| 3,093,026 | 6/1963 | Mills et al. | 411/34 |
| 4,168,650 | 9/1979 | Dahl et al. | |
| 4,376,604 | 3/1983 | Pratt et al. | 411/34 |
| 4,457,652 | 7/1984 | Pratt | 411/38 |
| 4,595,324 | 6/1986 | Sadri | 411/41 X |
| 4,832,548 | 5/1989 | Strobel | |
| 4,900,205 | 2/1990 | Sadri | |
| 4,950,115 | 8/1990 | Sadri | |
| 4,968,198 | 11/1990 | Binns | |
| 5,030,050 | 7/1991 | Auriol et al. | |
| 5,141,373 | 8/1992 | Kendall | 411/70 X |

Primary Examiner—Rodney M. Lindsey
Attorney, Agent, or Firm—Pretty, Schroeder, Brueggemann & Clark

[57] ABSTRACT

A blind fastener for fastening panels, especially panels made of composite materials, comprises a fastener body received within aligned openings in the panels and a cylindrical stem passing through the fastener body. The stem has an enlarged stem head spaced from an inner end of the fastener body which projects inwardly beyond the inner surface of the inner panel. A deformable sleeve mounted on the stem between the stem head and the inner end of the fastener body is a two-piece sleeve comprising a forming sleeve and a containment sleeve. The forming sleeve is made of a relatively soft, deformable material, whereas the containment sleeve is made of a relatively hard, nondeformable material. When the stem moves outwardly through the fastener body during setting of the fastener, the forming sleeve deforms to a fully set condition in overlying contact with the inner surface of the inner panel, forming a large bearing area that does not damage the composite material of the panels. However, the containment sleeve remains substantially undeformed, allowing the fastener to apply and maintain high clamping loads.

15 Claims, 2 Drawing Sheets

BLIND FASTENER WITH REINFORCED CONTAINMENT SLEEVE

BACKGROUND OF THE INVENTION

This invention relates to blind fasteners for use in fastening two panels together in overlapping outer and inner relation and, more particularly, to a blind fastener for fastening panels made of composite or other relatively soft materials.

Blind fasteners are used in a variety of applications in which access to the blind side surface of panels being connected together is extremely limited or in some cases not possible. For example, in the construction of aerodynamic designs, including aircraft and the like, a substantially flush surface usually is desired on the accessible side of the panels, while access to the blind side may not be possible. Such aerospace fasteners must meet or exceed stringent requirements. In particular, the fasteners must securely fasten the panels and resist losing their gripping power under the stresses, vibrations, and temperatures imposed upon them by the harsh environment in which they are used.

One type of blind fastener that satisfies these requirements comprises an internally threaded fastener body for insertion into aligned holes of the two panels, and an externally threaded cylindrical stem passing in threaded engagement through the fastener body. The inserted end of the stem has an enlarged stem head, and the outer end of the stem has a wrench engaging portion. Upon turning motion of the stem relative to the fastener body, the stem is moved in an axial outward direction through the fastener body. This axial outward movement causes a deformable sleeve around the stem and abutting against the stem head to deform around a tapered nose on the fastener body to a fully set condition against the inner panel. The stem further may be provided with a localized weakened region or break groove adapted to shear the stem at a predetermined torque. The break groove is preferably located axially along the stem such that the stem twists off in a substantially flush relation to the outer portion of the fastener body, i.e., the fastener body head, after the fastener is fully set. The fastener body head normally is received in a countersunk, flush relationship to the outer panel, thus providing an aerodynamic surface after the fastener is set.

Special considerations arise when blind fasteners are used to secure panels made of composite or other relatively soft or lightweight materials. When the deformable sleeve of a blind fastener reaches its fully set condition, it applies very high and localized stresses against the inner panel. Panels made from composite materials normally are unable to withstand these high localized stresses. As a result, the panels usually are crushed and damaged. To help alleviate these problems, when fastening panels made of composite materials, a deformable sleeve constructed from relatively soft material is used. In addition, the deformable sleeve usually is configured so that it will bulge laterally when being set against the inner panel to provide a large bearing area and distribute compression forces over a wider surface area of the inner panel.

In general, blind fasteners having the foregoing type of deformable sleeve provide a satisfactory area of engagement with the blind side of the inner panel, even though the deformable sleeve is made from a softer and, therefore, weaker material than blind fasteners used to set panels made from steel or other high strength materials. However, in some applications with stress sensitive panel materials, such as composite materials, a high strength deformable sleeve is desired, yet it cannot be used since it will tend to crush or damage the panel material.

Accordingly, there has existed a definite need for a blind fastener having a deformable sleeve that provides a large area of engagement with the blind side of the inner panel, yet provides the strength advantages of a deformable sleeve made from a harder material. The present invention satisfies this need and provides further related advantages.

SUMMARY OF THE INVENTION

The present invention comprises a blind fastener for mounting in an opening in a workpiece and, more particularly, for connecting two panels in overlapped outer and inner relation. The fastener is especially adapted for use in securing panels made of composite or other relatively soft or lightweight materials. For this purpose, the fastener employs a special two-piece deformable sleeve having a construction which produces a large bearing area for clamping against the workpiece, yet provides high-strength clamping characteristics. The fastener of the present invention provides these advantages by using a first sleeve made of a relatively soft, deformable material that produces a large area of engagement with the blind side of the panel, and by using a second sleeve made of a relatively hard, nondeformable material that provides the strength component, all without damage to the panel surface.

The fastener comprises an internally threaded generally tubular fastener body received within the openings in the panels. The fastener body has an inner end in the form of a tapered nose projecting inwardly beyond the inner panel, and an enlarged body head for engagement with the outer panel. An externally threaded cylindrical stem passes in threaded engagement through the fastener body. The stem has an enlarged stem head spaced from the tapered nose of the fastener body, and an outer portion extending outwardly beyond the fastener body head, which is provided with a wrenching surface for engagement by a fastener installation tool. Turning motion of the stem relative to the fastener body in one direction moves the stem in an axially outward direction through the fastener body, moving the stem head toward the tapered nose of the fastener body.

In accordance with the invention, a two-piece deformable sleeve is mounted on the stem between the stem head and the tapered nose of the fastener body. The deformable sleeve comprises a forming sleeve made of a relatively soft, deformable material surrounding the stem. A containment sleeve made of a relatively hard, nondeformable material surrounds a portion of the forming sleeve adjacent to the stem head. Movement of the stem outwardly through the fastener body during setting of the fastener deforms the forming sleeve over the tapered nose to a fully set condition in overlying contact with the inner surface of the panel or workpiece. However, the containment sleeve remains substantially undeformed and applies the highest possible clamping loads against the panels without crushing or damaging them.

The forming sleeve preferably is constructed from an annealed steel material, such as 304 stainless steel. The containment sleeve preferably is constructed from an age hardened steel material, such as A-286 CRES which has been heat treated.

In one aspect of the invention, the forming sleeve, which is substantially cylindrical, includes a portion of reduced diameter on its outer surface, forming a neck at the inner end of the forming sleeve adjacent to the stem head. A shoulder on the forming sleeve separates the normal outer surface of the forming sleeve from the reduced diameter neck. This neck is designed to receive the containment sleeve, such that the containment sleeve is held in a position on the stem between the stem head and the shoulder of the forming sleeve. In the preferred embodiment, the containment sleeve, which is also substantially cylindrical, includes a shoulder at its inner end projecting radially inward. This shoulder is designed to abut the stem head and the inner end of the forming sleeve.

In another aspect of the invention, the forming sleeve further includes a counterbore at its outer end for receiving a deformable plastic sleeve. This plastic sleeve, which is optional, may be used when it is necessary to provide sealing of the hole through which the blind fastener is mounted.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
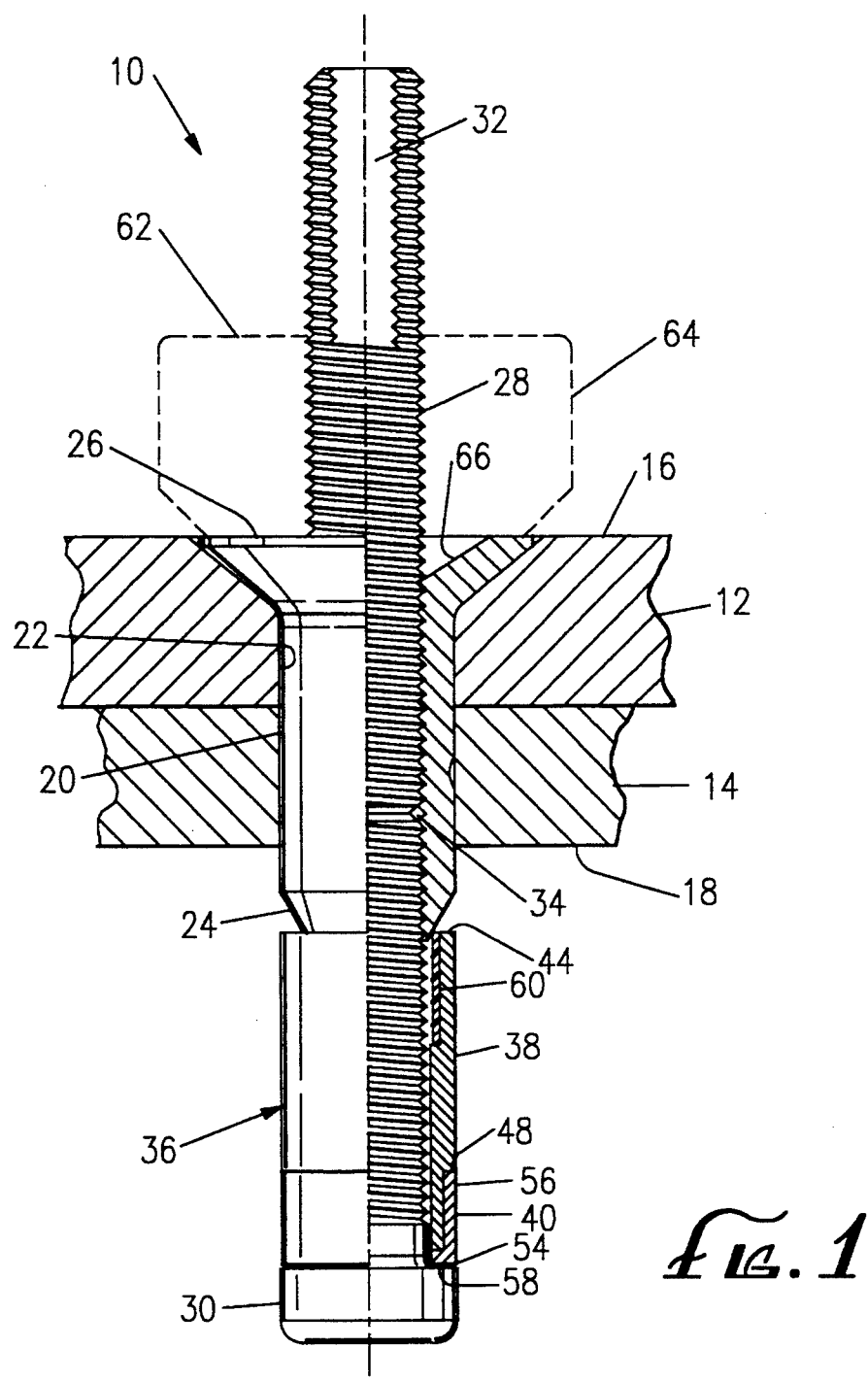
FIG. 1 is a cross-sectional elevational view of a blind fastener embodying the novel features of the present invention, showing the fastener inserted in two panels prior to the setting of the fastener.

As shown in the exemplary drawings, the present invention is embodied in a blind fastener, generally referred to by the reference numeral 10, for use in connecting two panels together in overlapped outer and inner relation. The fastener is provided with a two-piece deformable sleeve that produces a large bearing area for clamping against the inner panel, yet provides high strength clamping characteristics. This fastener construction has special utility when fastening panels made of composite materials, since the sleeve's large bearing area prevents crushing and damaging of the panels, while still providing the strength advantages associated with fasteners normally used to connect panels made from steel or other high strength materials.

Referring to FIG. 1, the blind fastener 10 of the present invention is shown in position for connecting two panels 12 and 14 together in overlapped outer and inner relation, with the outer panel 12 having an accessible outer surface 16 and the inner panel 14 having inaccessible or blind inner surface 18. The fastener 10 comprises an internally threaded, generally tubular fastener body 20 received within aligned openings 22 in the two panels 12 and 14. The fastener body 20 has a tapered nose 24 projecting inwardly beyond the inner surface 18 of the inner 14 panel and an enlarged body head 26 received in a substantially flush, countersunk relationship to the outer surface 16 of the outer panel 12. Enlarged body heads of the non-flush, protruding head type also may be used.

An externally threaded cylindrical stem 28 passes in threaded engagement through the fastener body 20. The inner end of the stem 28 has an enlarged stem head 30, and the outer end of the stem has a pair of wrenching flats 32 for engagement by an installation tool (not shown). If desired, a localized weakened region or breakgroove 34 may be provided at an axial location along the stem 28 such that, after the fastener 10 is fully set, the stem will shear at a point substantially flush with the outer surface of the fastener body head 26. In most cases, the stem 28 will twist off within a range of approximately one-eighth of an inch above or below the outer surface of the fastener body head 26.

In accordance with the invention, a two-piece deformable sleeve 36 is positioned on the stem 28 between the stem head 30 and the tapered nose 24 of the fastener body 20. This two-piece 36 sleeve comprises a forming sleeve 38 and a containment sleeve 40.

Figure 2:
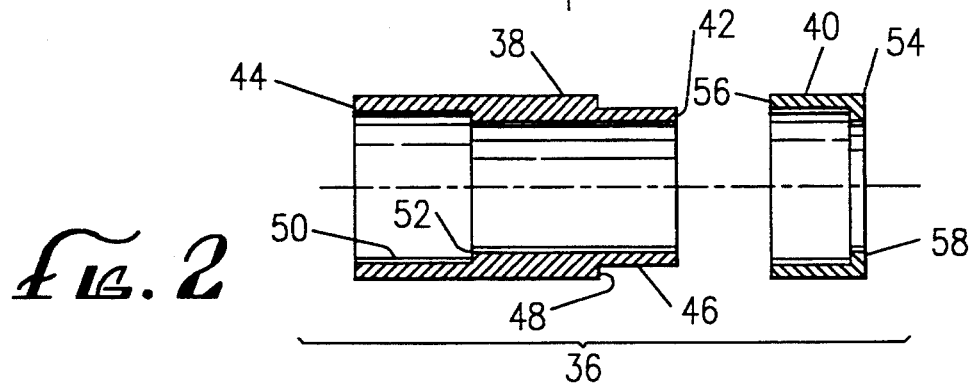
FIG. 2 is an exploded cross-sectional elevational view of one embodiment of a deformable sleeve used to set the fastener.

FIG. 2 shows one embodiment of the two-piece deformable sleeve 36 in greater detail. The forming sleeve 38 is substantially cylindrical and has an inner end 42 and an outer end 44. The inner end 42 of the forming sleeve 38 includes a portion of reduced diameter on its outer surface forming a neck 46. This neck 46 extends from an external shoulder 48 to the inner end 42 of the forming sleeve 38. The inner surface of the forming sleeve 38 also has a counterbore 50 extending from an internal shoulder 52 to the outer end 44 of the forming sleeve.

The containment sleeve 40 is substantially cylindrical and has an inner end 54 and an outer end 56. In the preferred embodiment, the inner end 54 of the containment sleeve 40 has a shoulder 58 projecting radially inward a short distance. The containment sleeve 40 is designed to fit over the neck 46 such that the outer end 56 of the containment sleeve 40 abuts the external shoulder 48 on the forming sleeve 38, with the inner end 42 of the forming sleeve 38 in abutment with the shoulder 58 of the containment sleeve 38. This fit between the containment sleeve 40 and the neck 46 preferably is a frictional-type fit so that the containment sleeve 40 is held in position on the forming sleeve 38 after assembly.

The outer dimensions of the forming sleeve 38 and the containment sleeve 40, as well as the outer dimensions of the fastener body 20 and stem head 30, are substantially the same, but are slightly less than the diameters of the openings 22 in the two panels 12 and 14. This sizing of the fastener 10 permits insertion of the fastener through the openings 22 in the two panels 12 and 14 to enable the fastener to perform its clamping function on the blind side 18 of the inner panel 14, as explained in more detail below. Alternatively, the fastener 10 may be sized to provide an interference fit between the fastener and the aligned openings 22 in the panels 12 and 14.

In the preferred embodiment, the forming sleeve 38 is constructed from a relatively soft, deformable material, such as an annealed steel material. For example, annealed 304 stainless steel is one such preferred material.

The containment sleeve 40 preferably is constructed from a relatively hard, nondeformable material, such as an age hardened, heat treated steel material. For example, heat treated, age hardened A-286 CRES is one such preferred material. The remaining components of the fastener 10, including the fastener body 20 and stem 28, preferably are constructed from stainless steel alloys, titanium or the like. For example, the fastener body 20 and stem 28 preferably are constructed from stainless steel materials.

Figure 3:
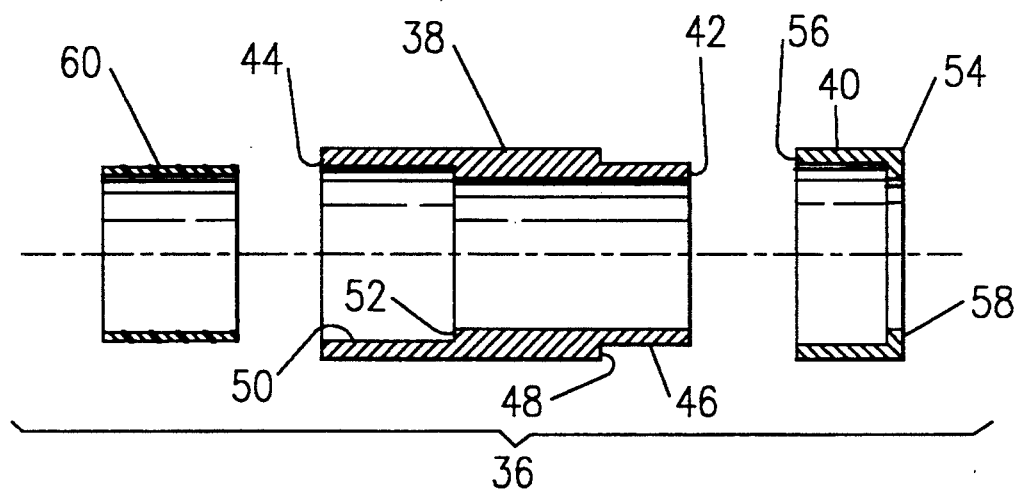
FIG. 3 is an exploded cross-sectional elevational view of another embodiment of a deformable sleeve used to set the fastener.

FIG. 3 shows another embodiment of the two-piece deformable sleeve 36, in which a cylindrical plastic insert 60 is positioned within the counterbore 50 of the forming sleeve 38. The plastic insert 60 is optional and may be used when it is desired to seal the openings 22 in the panels 12 and 14 being fastened.

To set the fastener 10 and clamp the two panels 12 and 14 together, the stem 28 is turned in one direction relative to the fastener body 20. The turning of the stem 28 relative to the fastener body 20 preferably is accomplished by applying a torque to the stem while holding the fastener body against rotational movement. Various conventional power driven installation tools having wrench bits may be used for setting and installing the fastener 10 in the appropriate manner.

To cause turning of the stem 28, the wrenching flats 32 are engaged by the rotary wrench bit of an installation tool (not shown). Of course, wrench-engaging means other than flats 32 may be provided on the stem 28, as desired. To prevent turning of the fastener body 20 within the panels 12 and 14 while the stem 28 is being turned, a drive nut 62 may be mounted on the stem 28 in abutment with the fastener body head 26. The drive nut 62 has an outer surface 64 for engagement by a non-rotating fitting on the installation tool (not shown). Engagement between the contacting surfaces of the drive nut 62 and the fastener body head 26 prevents rotation of the fastener body 20 while the drive nut 62 is being held stationary by the installation tool. Alternatively, when a drive nut 62 is not used, the installation tool may engage recesses 66 in the fastener body head 26 to hold it against rotation.

To install the fastener 10 of the present invention, the fastener is inserted into the aligned openings 22 in the two panels 12 and 14 until the fastener body head 26 is received against the outer surface 16 of the outer panel 12. The installation tool is moved axially onto the fastener 10, with the non-rotating fitting engaging either the drive nut 62 or the fastener body recesses 66 to hold the fastener body 20 against rotation, and with the rotary wrench bit engaging the wrenching flats 32 and turning the stem 28 in one direction to set the fastener. As the stem 28 is rotated, the stem is moved in an axial outward direction through the fastener body 20. As the stem 28 moves axially outwardly, the stem head 30 also urges the two-piece deformable sleeve 36 outwardly, causing the outer end 44 of the forming sleeve 38 to engage the tapered nose 26 and deform over the fastener body 20. Once the outer end 44 of the forming sleeve 38 engages the blind side 18 of the inner panel 14, the forming sleeve 38 is bulged laterally until it reaches a fully set condition.

Figure 4:
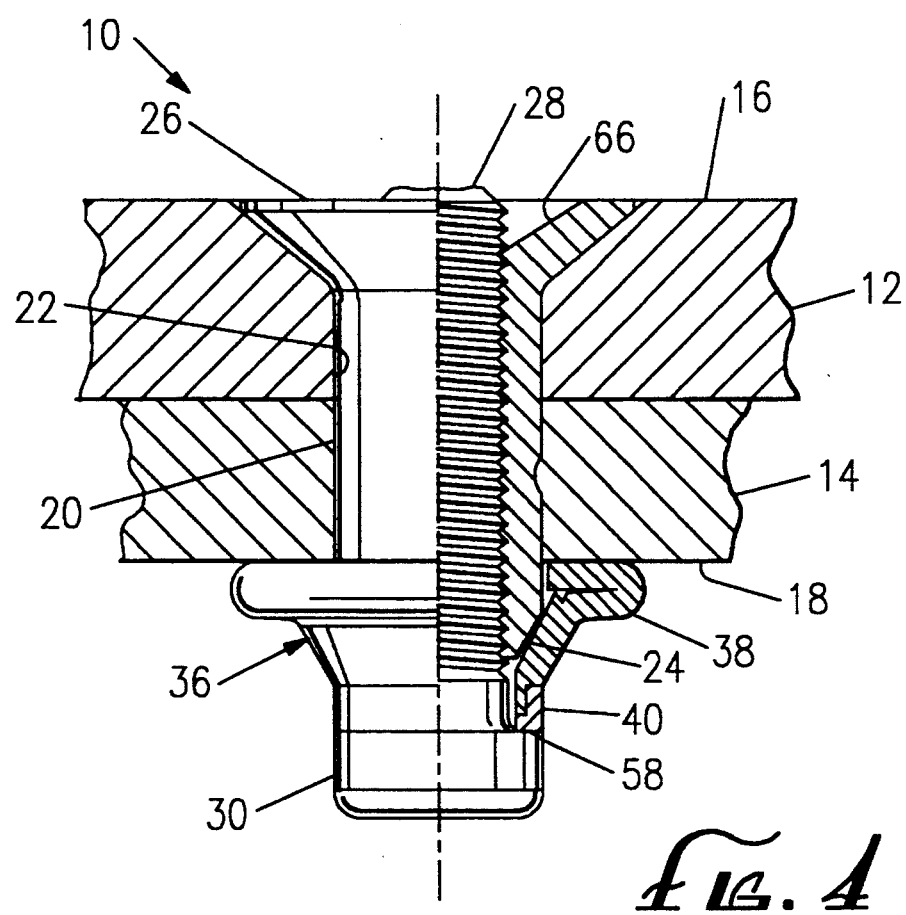
FIG. 4 is a cross-sectional elevational view of the blind fastener of FIG. 1, showing the fastener in a fully set condition securing two panels.

In the fully set condition, shown in FIG. 4, the forming sleeve 38 is fully deformed against the inner panel 14, providing a relatively large bearing area of engagement. This large bearing area distributes compression forces over a wider surface area of the inner panel 14, to help prevent crushing or damage to the panel surface 18. The circumstance that the forming sleeve 38 is constructed from a relatively soft, deformable material also helps prevent damage to the panel surface 18, since the outer end 44 of the forming sleeve 38 more easily deforms to a set condition against the panel's inner surface 18. The counterbore 50 in the outer end 44 of the forming sleeve 38 also provides a thinner, more easily deformable structure that further helps prevent panel damage.

Throughout setting of the fastener 10, however, the containment sleeve 40 remains substantially undeformed. Since the containment sleeve 40 remains substantially undeformed and is constructed from high-strength materials, it can apply the highest possible clamping loads against the panels 12 and 14.

Thus, the use of the forming sleeve 38, which produces a large bearing area for wide distribution of compression forces against the panels 12 and 14 using a relatively soft, deformable sleeve material, in combination with the containment sleeve 40, which applies high-strength clamping forces against the panels 12 and 14 by using a relatively hard, nondeformable sleeve material, enables the highest clamping loads to be applied against the panels without damage.

From the foregoing, it will be appreciated that the present invention provides a blind fastener 10 for securing panels 12 and 14 made of composite or other relatively soft or lightweight materials in which high clamping loads may be achieved without damage to the panel surface. During setting of the fastener 10, the relatively soft forming sleeve 38 provides a large bearing area of engagement with the panel surface 18 to provide a wide distribution of compression forces. However, the containment sleeve 40 does not deform, thereby providing the fastener 10 with the ability to apply the highest possible clamping loads to the panels 12 and 14. Thus, the fastener 10 of the present invention offers desirable features associated with the fastening of panels 12 and 14 made of composite materials, with the added features associated with fasteners ordinarily used only to fasten panels made of high strength materials.

While a particular form of the invention has been illustrated and described, it will be apparent that various modifications can be made without departing from the spirit and scope of the invention. Accordingly, it is not intended that the invention be limited, except as by the appended claims.

I claim:

1. A blind fastener for mounting in an opening in a workpiece having an outer surface and an inner surface, the fastener comprising:
  (a) an generally tubular fastener body received within the opening in the workpiece, the fastener body having an inner end projecting inwardly beyond the inner surface of the workpiece and an enlarged body head for engagement with the outer surface of the workpiece;
  (b) a cylindrical stem passing through the fastener body, the stem having an enlarged stem head spaced from the inner end of the fastener body;
  (c) means cooperating between the stem and the fastener body for preventing loosening of the fastener after the fastener has been set; and
  (d) a deformable sleeve mounted on the stem between the stem head and the inner end of the fastener body, wherein the deformable sleeve comprises:
    a forming sleeve made of a relatively soft, deformable material surrounding the stem, wherein the forming sleeve includes a reduced diameter portion on its outer surface forming a neck extending from an outer shoulder of the forming sleeve to an inner end of the forming sleeve, and a containment sleeve made of a relatively hard, nondeformable material surrounding the neck of the forming sleeve adjacent to the stem head, wherein the containment sleeve has an outer end in abutment with the outer shoulder of the forming sleeve, such that axial movement of the stem outwardly through the fastener body deforms the forming sleeve to a fully set condition in overlying contact with the inner surface of the workpiece, with the containment sleeve remaining substantially undeformed.

2. The blind fastener of claim 1, wherein the containment sleeve is substantially cylindrical and includes a shoulder at its inner end projecting radially inwardly for abutment with the stem head and the inner end of the forming sleeve.

3. The blind fastener of claim 1, wherein the forming sleeve is constructed from an annealed steel material and the containment sleeve is constructed from an age hardened, heat treated steel material.

4. The blind fastener of claim 1, wherein the forming sleeve is constructed from annealed 304 stainless steel and the containment sleeve is constructed from heat treated, age hardened A-286 CRES.

5. The blind fastener of claim 1, wherein the forming sleeve further includes a counterbore at its outer end.

6. The blind fastener of claim 5, further comprising a deformable plastic sleeve received within the counterbore of the form sleeve.

7. A blind fastener for mounting in an opening in a workpiece having an outer surface and an inner surface, the fastener comprising:
  (a) an internally threaded, generally tubular fastener body received within the opening in the workpiece, the fastener body having an inner end projecting inwardly beyond the inner surface of the workpiece and an enlarged body head for engagement with the outer surface of the workpiece;
  (b) an externally threaded cylindrical stem passing in threaded engagement through the fastener body, turning motion of the stem relative to the fastener body in one direction moving the stem in an axial outward direction through the fastener body, the stem having an enlarged stem head spaced from the inner end of the fastener body; and
  (c) a deformable sleeve mounted on the stem between the stem had and the inner end of the fastener body, wherein the deformable sleeve comprises:
    a substantially cylindrical forming sleeve made of a relatively soft, deformable material surrounding the stem, wherein the forming sleeve includes a reduced diameter portion on its outer surface forming a neck extending from an outer shoulder of the forming sleeve to an inner end of the forming sleeve, and
    a substantially cylindrical containment sleeve made of a relatively hard, nondeformable material surrounding the neck of the forming sleeve adjacent to the stem head, wherein the containment sleeve has an outer end in abutment with the outer shoulder of the forming sleeve, and an inner flange projecting radially inward for abutment with the inner end of the forming sleeve, such that movement of the stem outwardly through the fastener body deforms the forming sleeve to a fully set condition in overlying contact with the inner surface of the workpiece, with the containment sleeve remaining substantially undeformed.

8. The blind fastener of claim 7, wherein the flange of the containment sleeve projects radially inwardly for abutment with the stem head and the inner end of the forming sleeve.

9. The blind fastener of claim 7, wherein the forming sleeve is constructed from an annealed steel material and the containment sleeve is constructed from an age hardened, heat treated steel material.

10. The blind fastener of claim 7, wherein the forming sleeve is constructed from annealed 304 stainless steel and the containment sleeve is constructed from heat treated, age hardened A-286 CRES.

11. The blind fastener of claim 7, wherein the forming sleeve further includes a counterbore at its outer end for receiving a deformable plastic sleeve.

12. A blind fastener for mounting in aligned openings through two panels to connect them together in overlapped outer and inner relation and adapted to be set by wrench means, the fastener comprising:
  (a) an internally threaded, generally tubular fastener body received within the openings in the panels, the fastener body having an inner end projecting inwardly beyond the inner panel, and an enlarged body head for engagement with the outer surface of the outer panel;
  (b) an externally threaded cylindrical stem passing in threaded engagement through the fastener body, turning motion of the stem relative to the fastener body in one direction moving the stem in an axial outward direction through the fastener body, the stem having an outer portion spaced from the outer surface of the outer panel for engagement by the wrench means, and having an enlarged stem head spaced from the inner end of the fastener body; and
  (c) a deformable sleeve mounted on the stem between the stem head and the inner end of the fastener body, wherein the deformable sleeve comprises:
    a substantially cylindrical forming sleeve made of a relatively soft, deformable material surrounding the stem, wherein the forming sleeve includes a reduced diameter portion on its outer surface forming a neck extending from an outer shoulder to the inner end of the forming sleeve, and wherein the forming sleeve further includes a counterbore on its inner surface extending from an inner shoulder to the outer end of the forming sleeve, and
    a substantially cylindrical containment sleeve made of a relatively hard, nondeformable material surrounding the neck of the forming sleeve adjacent to the stem head, wherein the containment sleeve has its outer end in abutment with the outer shoulder of the forming sleeve, and wherein the inner end of the containment sleeve has a shoulder projecting radially inwardly for abutment with the stem head and the inner end of the forming sleeve, such that movement of the stem outwardly through the fastener body deforms the forming sleeve to a fully set condition in overlying contact with the inner surface of the inner panel, with the containment sleeve remaining substantially undeformed.

13. The blind fastener of claim 12, wherein the forming sleeve is constructed from an annealed steel material and the containment sleeve is constructed from an age hardened, heat treated steel material.

14. The blind fastener of claim 12, wherein the forming sleeve is constructed from annealed 304 stainless steel and the containment sleeve is constructed from heat treated, age hardened A-286 CRES.

15. The blind fastener of claim 12, wherein a deformable plastic sleeve is positioned in the counterbore of the forming sleeve, wherein the plastic sleeve extends from the inner shoulder of the forming sleeve to the outer end of the forming sleeve.

* * * * *